United States Patent
Sinai et al.

(10) Patent No.: US 11,669,291 B2
(45) Date of Patent: Jun. 6, 2023

(54) SYSTEM AND METHOD FOR SHARING ALTERED CONTENT OF A WEB PAGE BETWEEN COMPUTING DEVICES

(71) Applicant: Co-Commerce Shopping Platform Ltd., Ramat Gan (IL)

(72) Inventors: Eyal Sinai, Kfar Saba (IL); Adi Ronen Almagor, Ramat Gan (IL)

(73) Assignee: Co-Commerce Shopping Platform Ltd., Ramat Gan (IL)

( * ) Notice: Subject to any disclaimer, the term of this patent is extended or adjusted under 35 U.S.C. 154(b) by 0 days.

(21) Appl. No.: 16/660,944

(22) Filed: Oct. 23, 2019

(65) Prior Publication Data

US 2021/0124546 A1   Apr. 29, 2021

(51) Int. Cl.
| | |
|---|---|
| *G06F 3/0481* | (2022.01) |
| *G06F 3/14* | (2006.01) |
| *H04L 67/02* | (2022.01) |
| *G06F 40/106* | (2020.01) |
| *H04L 67/01* | (2022.01) |

(52) U.S. Cl.
CPC .......... *G06F 3/1454* (2013.01); *G06F 40/106* (2020.01); *H04L 67/02* (2013.01); *H04L 67/01* (2022.05)

(58) Field of Classification Search
CPC .................................................... G06F 3/1454
See application file for complete search history.

(56) References Cited

U.S. PATENT DOCUMENTS

| | | | | |
|---|---|---|---|---|
| 6,144,991 A | * | 11/2000 | England | H04L 29/06 709/205 |
| 6,233,600 B1 | * | 5/2001 | Salas | G06F 16/958 709/201 |

(Continued)

FOREIGN PATENT DOCUMENTS

| | | |
|---|---|---|
| EP | 2845443 | 1/2014 |
| EP | 3216166 | 5/2016 |

OTHER PUBLICATIONS

Fraternali et al., "Identifying Cultural Markers for Web Application Design Targeted to a Multi-Cultural Audience" Eighth International Conference on Web Engineering, © 2008 IEEE, pp. 231-239. (Year: 2008).*

(Continued)

*Primary Examiner* — Amelia L Tapp
(74) *Attorney, Agent, or Firm* — Pearl Cohen Zedek Latzer Baratz LLP

(57) ABSTRACT

A system and method of adaptively sharing at least one portion of a web page between computing devices by a processor may include: associating an identification of at least one first client computing device with an identification of one or more second client computing devices; receiving at least one client property of the one or more second client computing devices; receiving an indication of an event relating to presentation of the at least one web page portion on a screen of the first client computing device; adapting, in real time, at least one presentation property of the at least one web page portion, based on the event indication and on the at least one client property; and presenting the at least one web page portion on a screen of the one or more second client computing devices, based on the association of identification, and according to the adapted presentation property.

20 Claims, 6 Drawing Sheets

(56) References Cited

U.S. PATENT DOCUMENTS

| | | | |
|---|---|---|---|
| 7,546,534 B1* | 6/2009 | Andrews | A63F 13/12 |
| | | | 715/747 |
| 8,392,617 B1* | 3/2013 | Weber | H04L 67/02 |
| | | | 709/248 |
| 8,863,008 B2 | 10/2014 | Chan et al. | |
| 10,331,394 B1* | 6/2019 | Sarfi | G06F 9/452 |
| 11,204,955 B2* | 12/2021 | Fox | A61B 5/742 |
| 2009/0037517 A1 | 2/2009 | Frei | |
| 2013/0290863 A1* | 10/2013 | Chen | G06F 9/445 |
| | | | 715/747 |
| 2014/0195588 A1 | 7/2014 | Badge et al. | |
| 2015/0278534 A1 | 10/2015 | Thiyagarajan et al. | |
| 2016/0182577 A1* | 6/2016 | Lipman | H04L 51/046 |
| | | | 715/753 |
| 2016/0182643 A1 | 6/2016 | Badge et al. | |
| 2016/0343351 A1* | 11/2016 | Chen | G06F 3/1454 |
| 2020/0151797 A1* | 5/2020 | Parhar | G06Q 50/01 |

OTHER PUBLICATIONS

Hesselman et al., "Sharing Enriched Multimedia Experiences across Heterogeneous Network Infrastructures" IEEE Communications Magazine • Jun. 2010, pp. 54-65. (Year: 2010).*

International Search Report for PCT Appl. No. PCT/IL2020/051103 dated Feb. 7, 2021.

* cited by examiner

SYSTEM AND METHOD FOR SHARING ALTERED CONTENT OF A WEB PAGE BETWEEN COMPUTING DEVICES

FIELD OF THE INVENTION

The present invention relates generally to computer communication. More specifically, the present invention relates to adaptively sharing at least one portion of a web page between computing devices.

BACKGROUND OF THE INVENTION

Systems and methods that facilitate sharing of displayed content among a plurality of computing devices are commonplace in both private and work environments. Commercially available screen sharing systems enable users (e.g., commonly referred to in the art as 'publishers') to present or display the content of their screens to other users (e.g., commonly referred to as 'subscribers') of one or more other computing devices, so as to collaborate at work or leisure.

Some commercially available screen sharing systems facilitate selection and sharing of specific windows on a screen. For example, a window that may be related to a screen-sharing session may be presented to subscribers, whereas other windows that may, for example, contain personal or confidential information may be hidden from the subscribers' view.

SUMMARY OF THE INVENTION

Commercially available screen sharing systems do not allow adaptation or personalization of shared content according to specific properties of publishers and/or subscribers. Embodiments of the present invention may include a system and a method for adaptation of one or more presentation parameters of shared data content and presentation of the shared data content such that it may be personalized or optimized according to the subscribers' and/or publishers' preferences and/or according to the screen properties and/or according to configuration of the subscribers' and/or publishers' computing device.

Embodiments of the present invention may include a method of adaptively sharing at least one portion of a web page between computing devices by at least one processor. Embodiments of the method may include: associating (e.g., by the at least one processor) an identification of at least one first client computing device with an identification of one or more second client computing devices; receiving at least one client property of the one or more second client computing devices; receiving (e.g., by the at least one processor) an indication of an event relating to presentation of the at least one web page portion on a screen of the first client computing device; adapting (e.g., by the at least one processor), in real time or in near-real time, at least one presentation property of the at least one web page portion, based on the event indication and on the at least one client property; and presenting (e.g., by the at least one processor) the at least one web page portion on a screen of the one or more second client computing devices, based on the associating an identification, and according to the presentation property adapted based on the event indication and the at least one client property.

According to some embodiments of the invention, the client property may be selected from a list consisting of: one or more screen properties of the one or more second computing devices and one or more user preferences associated with the one or more second computing devices.

According to some embodiments of the invention, the presentation property may be selected from a list consisting of: an aspect ratio, a resolution, a location on a screen, a color, a page structure, a font, an object of a web page, a textual content, an image content, a language, a drawing, and a Uniform Resource Locator (URL).

According to some embodiments of the invention, the at least one processor may adapt the at least one presentation property by modifying a URL line of the web page and adapting the at least one presentation property according to the modified URL.

According to some embodiments of the invention, the at least one web page portion may be associated with one or more web page divisions, and the event may include a graphical action performed in relation to on one or more web page divisions on the first client computing device. The at least one processor may adapt the presentation property by applying a respective graphical action relating to respective web page divisions on the one or more second client computing devices.

According to some embodiments of the invention, the at least one web page portion may be associated with one or more divisions of a web page. The at least one processor may adapt, in real time or in near-real time, at least one presentation property pertaining to the one or more divisions, based on the event indication and on the at least one client property of the one or more second client computing devices. The at least one processor may present the at least one web page portion on the one or more second client computing devices based on the adapted presentation property.

According to some embodiments of the invention, the at least one processor may accumulate one or more user preferences associated with the one or more second computing devices in a database. The at least one processor may adapt the at least one presentation property of one or more divisions by personalizing the presentation property according to the accumulated user preferences.

According to some embodiments of the invention, the at least one processor may analyze at least one division of the web page to determine a privacy policy associated with the respective division. The at least one processor may present the at least one web page portion on a screen of the one or more second client computing devices based on the determined privacy policy.

According to some embodiments of the invention, the at least one web page portion may be associated with one or more divisions of a web page. The at least one processor may: receive a viewing indication relating to presentation of the at least one web page portion on a screen of at least one second client computing device; adapt, in real time or in near-real time, at least one presentation property pertaining to the at least one web page division, based on the viewing indication; and present the at least one web page portion on the screen of the first client computing device, based on the adapted presentation property.

Embodiments of the invention may include a system for adaptively sharing at least one portion of a web page between computing devices. Embodiments of the system may include: a non-transitory memory device (e.g., element 4 of FIG. 1), wherein modules of instruction code may be stored, and one or more processors and/or controllers (e.g., element 2 of FIG. 1) that may be associated with the memory device and may be configured to execute the modules of instruction code. The one or more processors may be further configured, upon execution of said modules of instruction code, to: associate an identification of at least one first client computing device with an identification of one or more second client computing devices; receive at least one client property of the one or more second client computing devices; receive an indication of an event relating to presentation of the at least one web page portion on a screen of the first client computing device; adapt, in real time, a value of at least one presentation property of the at least one web page portion, based on the indication of the event and on the at least one client property; and present the at least one web page portion on a screen of the one or more second client computing devices, based on the associating an identification, and according to the adapted presentation property value.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
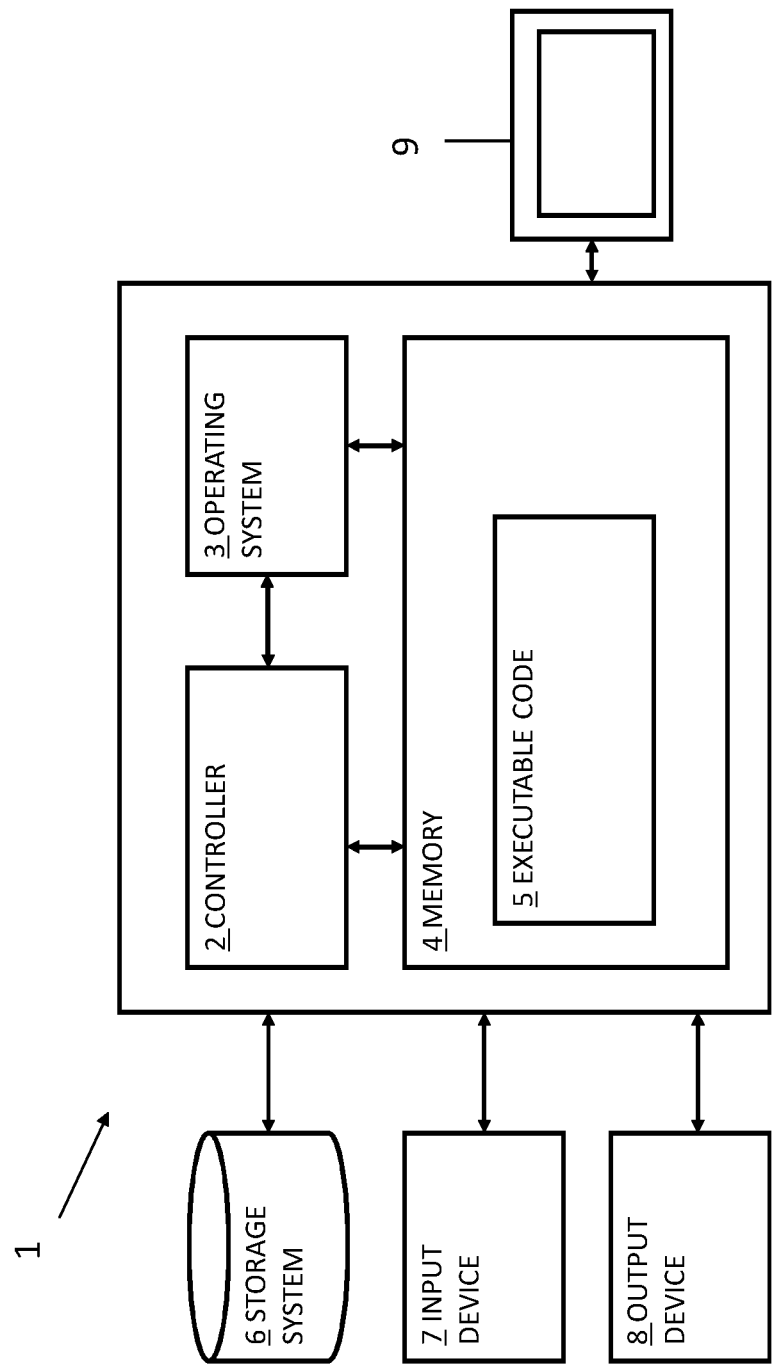
FIG. 1 is a block diagram depicting a computing device which may be included in a system for adaptively sharing at least one portion of a web page between computing devices according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "associating", "adapting", "receiving", "presenting", "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention may include a method and a system for adaptively sharing at least one portion of a web page between computing devices, as elaborated herein.

Reference is now made to FIG. 1, which is a block diagram depicting a computing device 1, which may be included within an embodiment of a system for adaptively sharing at least one portion of a web page between computing devices, such as computing device 1, according to some embodiments.

Computing device 1 may include a controller 2, an operating system 3, a memory 4, executable code 5, a storage system 6, one or more input devices 7, one or more output devices 8, and one or more monitors or displays 9. Controller 2 may be a central processing unit (CPU) processor, a chip or any suitable computing or computational device. Controller 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In some embodiments of the invention, a non-transitory storage medium, a hard disk drive, another storage device, etc., such as memory 4, may store instructions or code which when executed by a processor may cause the processor to carry out methods as described herein.

Executable code 5 may be any executable code, e.g., an application, a program, a process, task or script. Executable code 5 may be executed by controller 2 possibly under control of operating system 3. For example, executable code 5 may be an application that may perform a method for adaptively sharing at least one portion of a web page between computing devices by, for example, associating identifications of two or more computing devices, such as computing device 1, receiving at least one client property, receiving an indication of an event, adapting, in real time, a value of at least one presentation property based on the even indication and at least one client property, and presenting the at least one web page portion on a screen 9 based on the association and presentation property, as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to a session of screen sharing, such as the association, client property, indication of the event, and the presentation property, may be stored in storage system 6 and may be loaded from storage system 6 into memory 4 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to computing device 1 as shown by blocks 7 and 8. The one or more monitors or displays 9 may be, for example, a cathode-ray tube ("CRT") monitor, a liquid crystal display ("LCD") monitor, a light emitting diode ("LED") monitor and the like.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

Figure 2:
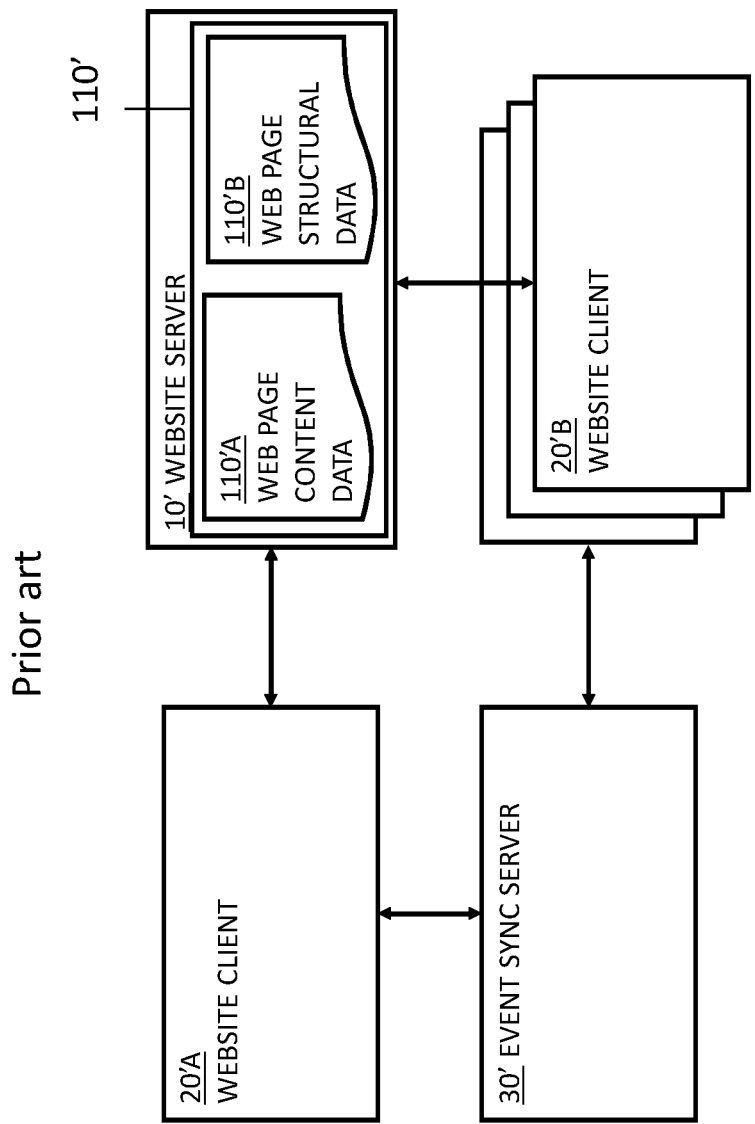
FIG. 2 is a block diagram depicting a system for sharing content of a web page between computing devices, as known in the art.

Reference is now made to FIG. 2 which is a block diagram, depicting a system for sharing content of a web page 110' (e.g., 110'A, 110'B), such as website or web page structural data (e.g., 110'B) and website or web page content data (e.g., 110'A) between computing devices 20'A and 20'B, as known in the art.

For example, a website server 10' may store (e.g., on a storage element, on a memory element and the like) web page content data 110'A (e.g., text, images, videos, etc.) that may be presented on a screen of a subscriber's computing device (e.g., one of 20'A and 20'B) (e.g., by a web browser). Website server 10' may also store web page structural data 110'B (e.g., a number of columns, a format of divisions, a font of text, and the like), that may relate to a manner of presenting the data on the subscriber's browser, as known in the art.

As shown in FIG. 2, commercially available screen sharing systems may include an event synchronization server 30' that may be communicatively connected to one or more website client computing devices 20'A and 20'B).

Event synchronization server 30' may allow synchronization of the presentation of web page data 110' (e.g., 110'A, 110'B) among a plurality of website client computing devices 20'A and 20'B). For example, a first user (e.g., a publisher) may present a portion of a web page (e.g., 110') (e.g., by the action of scrolling) on the screen of a first computing device (e.g., 20'A). Event synchronization server 30' may determine the web page portion that may be presented on the screen of the first computing device (e.g., 20'A) and may communicate with a second client computing device (e.g., 20'B) to present a similar portion of the web page on the screen of the second client computing device (e.g., 20'B).

One problem with commercially available screen sharing systems is that they may not adapt content of web pages and/or present the content of web pages on different client computing devices so as to match specific client properties.

For example, commercially available systems may not present shared data content as personalized content according to a user's preference. This may result, for example, in certain information that a publisher may not want to share with a subscriber being visible to the subscriber or result in certain information that a publisher wishes to share with the subscriber not being visible by the subscriber. Alternatively, this may result in information that may be shared between computing devices of the publisher and subscriber in a manner that is devoid of or oblivious to each user's preferences (e.g., oblivious to a user's identity, their preferred language, previous selections made by the users, etc.)

In another example, commercially available systems may not present shared data content in a manner that may be optimized according to screen properties (e.g., aspect ratio, resolution, etc.) of the subscribers' computing device. This may result in certain data being hard to read/understand by the subscriber and/or result in a degradation of the viewing experience, especially when sharing images or videos.

In another example, commercially available systems for screen sharing may prevent subscriber users from viewing specific windows (e.g., login dialog windows including a password textbox) that may be presented on a screen of a publisher's computing device, but may not alter specific parameters of the publisher's windows (e.g., translate a password text to asterisks) and present the altered version of the window to one or more subscribers. In such scenarios, the subscriber user may think the publisher user is doing anything when, for example, inputting password, which may be problematic, for example, in step by step tutorials where one of the steps requires the subscriber to input the subscriber's password or other information into a certain window to proceed.

In another example, commercially available systems may not enable users of different client computing devices (e.g., having different screen properties) to collaborate by performing actions (e.g., selection, marking and/or drawing graphical elements) on their respective screens. For example, a first user (e.g., a publisher, using client computing device 20'A) may desire to draw attention to a specific graphical element on a web page by marking a circle around it. Commercially available systems for screen sharing may present the marked circle on screens of one or more subscriber computing devices (e.g., 20'B). However, as commercially available systems may be oblivious to screen parameters (e.g., aspect ratio) of the one or more subscriber computing devices 20'B, the marked circle may be misplaced in relation to the item of interest, and, thus, not direct the subscriber's attention to the correct area of the screen.

In yet another example, as commercially available systems may be oblivious to screen parameters, such commercially available systems may not enable a first client computing device 20'A to mark or highlight a location or portion which may be simultaneously viewed by a user of a second client computing device 20'B.

As elaborated herein, embodiments of the present invention may be configured to adapt content of web pages and/or present the content of web pages on different client computing devices so as to match specific client properties. Embodiments of the present invention may thus overcome the shortcomings of commercially available systems and methods of screen sharing, as exemplified above.

For example, embodiments of the invention may enable a publisher user to share their screen with a subscriber user, in a sense that both users may view the same web page substantially at the same time (e.g., collaborate in web browsing through an online shopping web page for clothes). As elaborated herein (e.g., in relation to FIGS. 3A and 3B) embodiments of the invention may receive at least one value of a presentation property (e.g., element 330A of FIGS. 3A and 3B) and produce (e.g., by translation module 330 of FIGS. 3A and 3B) at least one altered or adapted presentation property value (e.g., element 330A' of FIGS. 3A and 3B). This adaptation may, for example, take into account each user's identity, so as to present the shared web page on each user's device (e.g., elements 20A, 20B of FIG. 3A and 20C of FIG. 3B) according to their respective identity (e.g., to include their respective names).

Additionally, or alternatively, the adaptation may take into account each user's preferences (e.g., their preferred language, previous selections made by the users, etc.) to present the shared web page on each user's device (e.g., element 20A, 20B, 20C) according to these preferences. Pertaining to the example of browsing through an online shopping web page for clothes, this may mean that both users may see depiction of a similar item (e.g., a shirt), where a first user may see it in a first color and described in a first language whereas a second user may see it in a second color and described in a second language.

Additionally, or alternatively, the adaptation may take into account properties of each client device (e.g., screen resolution and/or aspect ratio) so as to present the shared web page in a manner that best fits the properties of each client device.

Figure 3A:
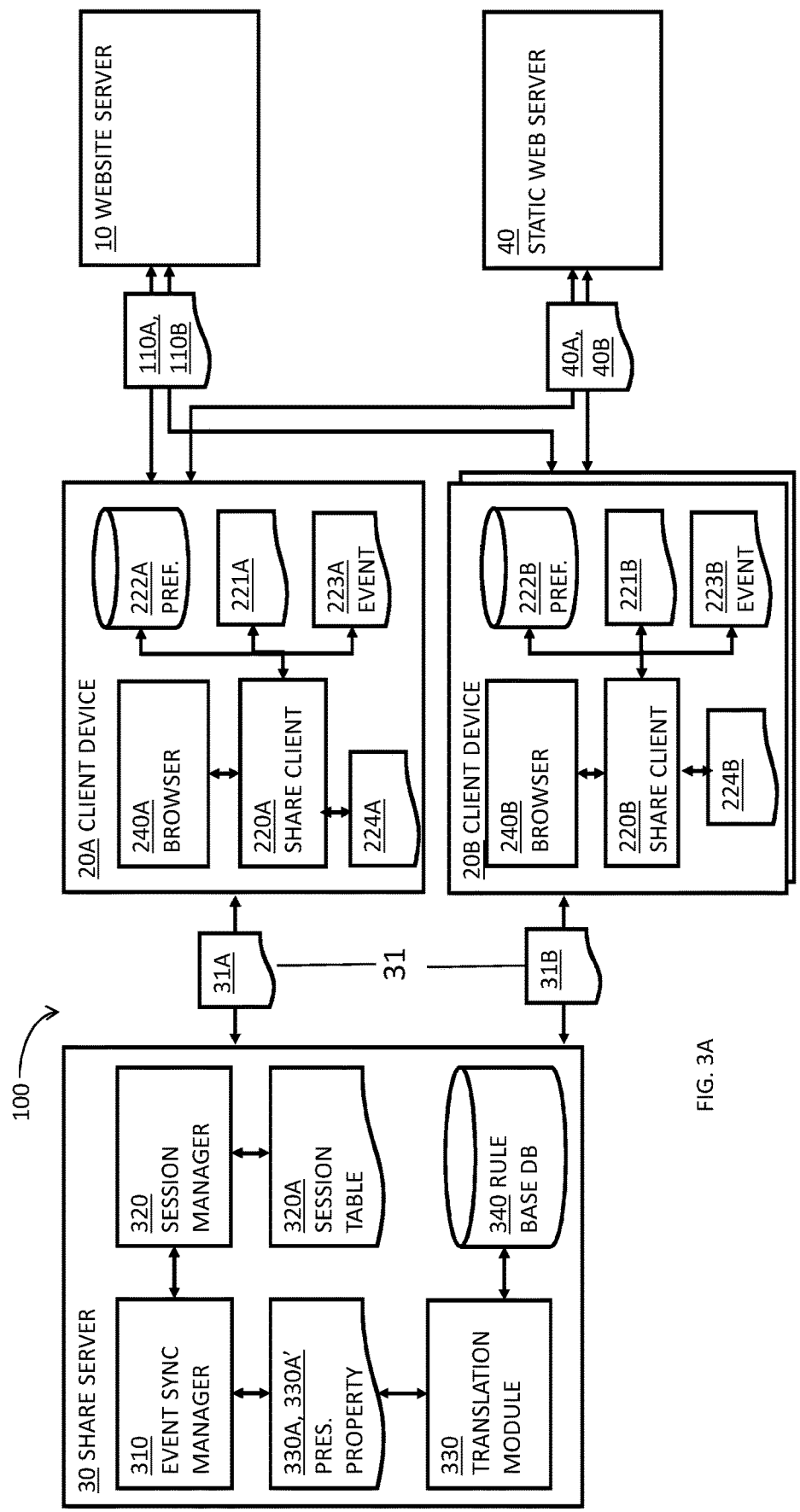
FIGS. 3A and 3B are block diagrams depicting a system for adaptively sharing at least one portion of a web page between computing devices, according to some embodiments.

FIG. 3A is a block diagram, depicting a system 100 for adaptively sharing at least one portion of a web page between computing devices, according to some embodiments. As shown in FIG. 3A, system 100 may include a share server 30, adapted to manage sessions of screen sharing among a plurality (e.g., two or more) of client devices (e.g., 20A and 20B). Each of share server 30 and client devices 20A and 20B may be implemented as a hardware module, a software module or any combination thereof.

For example, share server 30 and/or client devices 20A and 20B may each be or may each include one or more computing devices, such as computing device 1 of FIG. 1, including at least one processor or controller, such as element 2 of FIG. 1, adapted to implement, for example, one or more methods for adaptively sharing at least one portion of a web page among the plurality of client devices, as elaborated herein.

According to some embodiments of the invention, one or more client devices 20A and 20B (e.g., smartphones, laptop computers, tablet computers and the like) may communicate, via a computer communication network (e.g., the internet, a cellular network and the like) with a computing device, such as a website server 10 (e.g., one or more computing devices, such as computing device 1 of FIG. 1). Website server 10 may, for example, manage a website, and may provide to the one or more client devices 20A and 20B, at least one of web page content 110A (e.g., 110'A of FIG. 2) and/or web page structural data 110B (e.g., 110'B of FIG. 2), as known in the art. Client devices 20A and 20B may include a web browser (e.g., 240A and 240B respectively) that may present the web page on one or more screens (e.g., screens such as screen 9 of FIG. 1) of client devices 20A and 20B, as known in the art.

According to some embodiments of the invention, system 100 may include a static web server 40, that may be associated with website server 10. In some embodiments, static web server 40 may be implemented as a one or more separate computing devices, such as element 1 of FIG. 1, and may be communicatively connected (e.g., via the internet) with one or more website servers (e.g., one or more computing devices such as computing device 1 of FIG. 1), such as servers that manage websites of different legal entities commercial entities and the like. Additionally, or alternatively, static web server 40 may be implemented on the same one or more computing devices as website server 10 and may be dedicated to a specific website. Additional embodiments may include any combination of the embodiments elaborated herein.

According to some embodiments of the invention, website server 10 may refer one or more client devices 20A and 20B to static web server 40. Static web server 40 may provide to the one or more client devices 20A and 20B a static site configuration 40A, including, for example a configuration for one or more action or trigger buttons, (e.g., for a visual configuration and/or an initial language). Additionally, or alternatively, static web server 40 may provide to the one or more client devices 20A and 20B static code 40B that may include, for example, code responsible for client-side communication with share server 30.

Static site configuration 40A and/or static code 40B may be utilized by the one or more client devices 20A and 20B to adapt content (e.g., 110A) and structure (e.g., 110B) of the website, as elaborated herein. For example, static code 40B may include a reference or an address (e.g., an internet protocol (IP) address, a Media Access Control (MAC) address, a communication socket ID and the like) to share server 30 that may be adapted to manage a screen sharing session among the plurality of client devices 20A and 20B, as elaborated herein.

According to some embodiments of the invention, share server 30 may include a session manager 320, adapted to manage a screen sharing session among the plurality of client devices 20A and 20B. The term "screen sharing session", or 'session' for short may be used herein in reference to a period of time in which two or more client devices may simultaneously present or display (e.g., on a screen, such as screen 9 of FIG. 1) one or more portions of a web page associated with or originating from website server 10.

Session manager 320 may monitor and/or store (e.g., on storage device or system 6 of FIG. 1) a session table 320A that may include one or more data elements pertaining to a session. Session table 320A may be implemented as any appropriate data structure such as a table in a database.

Session table 320A may include, for example, one or more of: an identification number (ID) of a session, a context of a session (e.g., an identification, such as a URL of a shared website), an identification (e.g., a MAC address) of a client device (e.g., one of client devices 20A and 20B), an identification (e.g., a name) of one or more users participating in a session, a time of participation of one or more user in a session, an identification of a publisher user (also referred to in the art as an 'influencer'), an image of the publisher user, a list of events that may have occurred during a session, as elaborated herein and/or a list of messages that may have been transferred among client devices during the session.

According to some embodiments, a screen sharing session may be associated with a single publisher user that may lead the session from its initiation until its end. Additionally, or alternatively, a screen sharing session may be associated with a plurality of publisher users. For example, a session may begin with a first user in the role of a publisher. Users may change the identity of the publisher (e.g., via input device 7 of FIG. 1), to have another user in the role or the publisher, so as to share their screen and lead the screen sharing session.

According to some embodiments of the invention, session manager 320 may associate an identification (e.g., an IP address, a MAC address, a communication socket ID and the like) of at least one first client computing device (e.g., 20A) with an identification of one or more second client computing devices (e.g., 20B). For example, session manager 320 may associate a first client computing device 20A and a second client computing device 20B as participating in or pertaining to the same screen sharing session, by session table 320A.

According to some embodiments, the one or more client devices 20A and 20B may include or may implement a share client module 220A and 220B, respectively. Share client modules 220A and 220B may, for example, be a software module that may be executed by at least one processor (e.g., element 2 of FIG. 1) of the respective client device (e.g., one of 20A and 20B). Share client modules 220A and 220B may obtain at least one client property (e.g., elements 221A, 221B, 222A, 222B) of the respective client device (e.g., one of 20A and 20B), as elaborated herein.

Share client modules 220A and 220B may communicate (e.g., via the internet) with share server 30 and may provide the at least one client property (e.g., elements 221A, 221B, 222A, 222B) of the one or more client computing devices 20A and 20B as a communication message 31 (e.g., 31A, 31B) to share server 30.

The at least one client property may include, for example, one or more screen properties 221A and 221B of client computing device (e.g., 20A and 20B respectively), including, for example, an aspect ratio, a resolution and the like.

Additionally, or alternatively, the at least one client property may include, for example, one or more user preferences that may be associated with the one or more client computing device 20A and 20B and/or with a user of the one or more client computing device 20A and 20B.

For example, the one or more user preferences 222A and 222B may include a definition or configuration that may be maintained or stored on client devices 20A and 20B, respectively, including for example a preferred human language (e.g., English, Chinese, etc.).

In another example, the one or more user preferences 222A and 222B may include at least one previous selection that may have been made by a user of client device (e.g., one of 20A and 20B) and may have been stored (e.g., as a cookie) in a memory location that may be associated with a browser (e.g., one of 240A and 240B). For example, a user may browse through a shopping website for shoes. The user may enter their shoe size during a process of selecting their preferred shoe and the user preference (e.g., one of 222A or 22B) (e.g., the preferred shoe size) may be maintained as a cookie in a memory space in, or associated with, browser (one of 240A and 240B).

According to some embodiments, share client modules 220A and 220B may be configured to accumulate (e.g., over a period of time) one or more user preferences that may be associated with the respective client computing device (e.g., one of 20A and 20B) in a preference database (e.g., marked in FIG. 3A as 222A and 222B). According to some embodiments, the database may be located or implemented locally (e.g., on a storage device (e.g., storage system 6 of FIG. 1) associated with client device (e.g., one of 20A and 20B)). Additionally, or alternatively, the preference databases 222A and 222B may be implemented or located globally, e.g., on a storage server (e.g., one or more computing devices, such as computing device 1 of FIG. 1) that may communicatively connected (e.g., via the internet) to share server 30, such as a cloud-based storage server (e.g., one or more computing devices, such as computing device 1 of FIG. 1). Embodiments of the invention may include adapting at least one value of a presentation property of one or more web pages and/or divisions of web pages by personalizing the at least one presentation property according to the accumulated user preferences, as elaborated herein.

According to some embodiments, share server 30 may receive (e.g., as a communication message 31) an indication of an event (e.g., at least one of 223A and 223B) relating to presentation of the at least one web page portion on a screen of a client computing device (e.g., one of 20A and 20B).

For example, a first computing device (e.g., 20A) may be used by a publisher (e.g., a user who may lead the screen sharing session) and one or more second computing devices (e.g., 20B) may be used by a subscriber (e.g., a user who may follow the publisher in the screen sharing session). At least one share client (e.g., 220A) on the publisher's computing device (e.g., 20A) may monitor at least one event (e.g., 222A) that may take place during presentation of at least a portion of a web page (e.g., having web page content 110A) on a screen (e.g., screen 9 of FIG. 1) of the publisher's computing device 20.

The at least one event (e.g., 222A) may, for example, include an action that may be performed by the publisher on client device (e.g., 20A), including for example, locating a mouse at a specific position on the web page, scrolling through the web page, selecting one or more items or elements in the web page and the like.

Additionally, or alternatively, the at least one event (e.g., 222A) may, for example, include a change that may be made to the presentation of the web page by a background process (e.g., not by an action of the publisher user), for example, in browser (e.g., 240A) and/or in website server 10. Such a change may include, for example, a change due to an automated refresh of the web page, a change due to time lapse, a change of at least one data content element 110A of the web page, and the like.

According to some embodiments of the invention, share server 30 may include an event synchronization manager 310 that may be adapted to synchronize between a presentation of a web page and/or a portion thereof on a first client device 20A (e.g., of a publisher user) and a presentation of the web page and/or portion thereof on one or more second client devices 20B (e.g., of a subscriber users).

For example, event synchronization manager 310 may be configured to receive a communication message 31A that may include at least one event notification 223A from the first client device 20A (e.g., a scroll-down of the presented web page) and produce a corresponding message 31B to the one or more second client devices 20B that may include a corresponding action (e.g., a scroll-down of the presented web page) so as to synchronize between the presentation of the web page between the first client device 20A and the one or more second client devices 20B.

Additionally, or alternatively, event synchronization manager 310 may collaborate with a translation module 330, which may be configured to adapt, in real time or in near-real time, a value of at least one presentation property 330A of at least one web page portion, based on the event indication and on the at least one client property.

The terms "real time" and "real-near time" may be used in this context to refer to actions that may be performed by embodiments of the invention, substantially concurrently or shortly after an appearance or a change in an appearance of a portion of a web page on a screen of a publisher's user device.

As shown in FIG. 3A, translation module 330 and/or rule-base database 340 may be included in or associated with share server 30. It may be appreciated by a person skilled in the art that translation module 330 and/or rule-base database 340 may also reside in or be associated with one or more share client modules (e.g., 220A and/or 220B). For example, share clients 220A and/or 220B may include a translation module (e.g., element 2270 of FIG. 4), associated with a respective set of translation rules (e.g., element 227 of FIG. 4) that may perform similar functions to those of translation module 330 (and respective rule-base database 340) as elaborated herein, and will not be repeated for the purpose of brevity.

Additionally, or alternatively, embodiments of the invention may include a first translation module 330 on share server 30 and one or more second translation modules (e.g., element 2270 of FIG. 4) on one or more respective client devices 20A and 20B. According to some embodiments, first translation module 330 may be configured to perform a first set of translation tasks or operations, and the one or more second translation modules 2270 may be configured to perform a second set of translation tasks or operations. For example, first translation module 330 may be configured to perform translations actions that may pertain to a privacy policy of one or more websites, as elaborated herein, and the one or more second translation modules may be configured to perform translations actions that may pertain to screen properties of respective one or more client devices 20A and 20B, as elaborated herein.

Pertaining to the example of the scroll-down action, event synchronization manager 310 may receive an indication of a scroll-down action of the presented web page on the first client device 20A. In this example, the at least one presentation property 330A may be the position of the presented web page due to the scroll-down action. Event synchronization manager 310 may propagate the scroll-down action indication and/or presentation property 330A to translation module 330. Translation module 330 may produce an adapted presentation property value 330A' (e.g., the position of the web page on the screen) for one or more second client devices, according to their respective client properties (e.g., screen properties, such as aspect ratio, resolution, etc.).

Share server may communicate at least one message 31B with the one or more share client modules 220B on respective one or more second client devices 20B, based on the association of identification of client devices in session table 320A. The at least one message 31B may include one or more adapted values of presentation properties 330A'. Share client module 220B may be configured to communicate the one or more adapted values of presentation properties 330A' to web browser 240B, so as to present at least one web page portion on a screen of the one or more second client devices 20B according to the adapted presentation property.

Thus, embodiments of the invention may provide adaptive synchronization of presentation of at least one portion of a web page among a plurality of client devices 20A and 20B.

The synchronization may be adaptive in a sense that it may be changed or computed according to at least one client property of one or more specific client devices (e.g., according to screen properties, according to user preferences and the like).

The synchronization may be based upon association of identification of two or more computing devices in a sense that it may be performed among client devices that participate in a screen sharing session (e.g., as maintained in entries of session table 320A).

The synchronization may be performed according to an adapted value of presentation property 330A' in a sense that the adapted presentation property value 330A' (e.g., a location of the web page in the example of the scroll-down action) may be applied by web browser 240B to present the at least one portion of the web page (e.g., data content 110A) on a screen of client device 20B.

According to some embodiments of the invention, presentation property 330A may include, for example, at least one of: an aspect ratio, a resolution, a location on a screen, a color, a page structure, an object of a web page, an image content, a textual content, a font, a language, a drawing and a URL. Translation module 330 may be associated with a rule-base database 340, that may include one or more rules for translating at least one presentation property 330A so as to produce at least one respective adapted value of presentation property 330A', according to client properties of client devices 20B.

For example, in a condition in which the presentation property 330A is an aspect ratio or a resolution, rule-base database 340 may include a set of rules for adapting a value of an aspect ratio or resolution of a presented web page or a portion thereof, so as to best match client properties (e.g., screen properties) of client devices.

In another example, in a condition in which the presentation property 330A is an object of a web page such as entries in an online form, rule-base database 340 may include a set of rules for adapting the entries in the online form to include data that may be specific to the user of client device 20B (e.g., according to user preferences 222B).

In another example, embodiments of the invention may enable a plurality of users to collaborate in a shared-screen session of reserving theatre tickets. In this example, presentation property 330A may be objects of a web page of a theatre. The objects may each represent seats in the theatre, and translation module 330 may adapt each of the seat objects to reflect (e.g., by a color code) which seats are vacant, which are occupied by undisclosed people, which are occupied by participants of the session (e.g., "my friends") and which seat is reserved for the user of a respective client device (e.g., "me"). In this condition, the users participating in the screen sharing session may be sharing their screens in a sense that they may be observing the web page (e.g., of the theatre) together and may have actions (e.g., selection of a movie by a publisher user) applied on web browsers of one or more (e.g., all) participants of the session. However, the sharing may be adaptive in a sense that one or more values of presentation properties 330A (e.g., an object of a seat) may be adapted according to an identity of respective specific users.

In another example, in a condition in which the presentation property 330A is a location of a web page or a portion thereof on a screen, translation module 330 may produce at least one adapted presentation property value 330A' (e.g., an adapted location) as according to client properties of client devices 20B (e.g., as elaborated herein in relation to the scroll-down action example).

In another example, embodiments of the invention may enable adaptive screen sharing among shoppers in webpage of an online clothing store. for example, in a condition in which the presentation property 330A is a content of an image object (e.g., an image gallery), rule-base database 340 may include a set of rules for selection and/or presentation of the image object according to one or more client properties (e.g., user preferences 222A and/or 222B). For example, if a first user has made previous selections to present clothing of an extra-large fit in an online clothing shop website, then translation module 330 may adapt presentation property value 330A (e.g., the selectable image gallery) to show large cloths as a default selection on the first user's client device 20A. If a second user has made previous selections to present clothing of a small fit in an online clothing shop website, then translation module 330 may adapt presentation property value 330A (e.g., the selectable image gallery) to show small cloths as a default selection on the second user's client device 20B. In this condition, the first user and second user may be sharing their screens in a sense that they may be observing the same pages of the website and may have actions of the first user also implemented on the browser of the second user, however they may have the presented data adapted according to their specific client properties (e.g., user preferences).

In another example, in a condition in which the presentation property 330A is a language, embodiments of the invention may include adaptively synchronizing presentation of text (e.g., in written format and/or in audio format), and may facilitate collaboration between two or more people, each using their own language of preference. For example, a first user may prefer to use French and a second user may prefer to use Italian. The first user and second user may participate in a shared screen session, where both may be viewing a specific document. The users may be sharing their screens in a sense that both may be viewing a presentation of versions of the same document (e.g., a first version in French and a second version in Italian). The presentations of the text may be synchronized in a sense that both users may be viewing the same location in their respective versions of the text and actions performed by a publisher viewer (e.g., marking a portion of the text) may be also applied on the browser of the second viewer. However, the synchronization of presentation of data by browsers 240A and 240B of respective client devices 20A and 20B may be adapted in a sense that the text may be presented in a language matching a preference of the respective users.

As known in the art, website server 10 may manage one or more adaptive websites, as commonly referred to in the art. Adaptive websites may modify information (e.g., data content 110A) and/or presentation of the information (e.g., as manifested in structural data 110B) that may be included in a web page to address a specific user's needs. For example, an adaptive website may include a first version of a web page, accessible by a first URL, in a first language and a second version of the web page, accessible by a second URL, in a second language, allowing a user to select the web page version according to their preference.

According to some embodiments, share server 30 may adaptively synchronize a presentation of a web page among two or more client devices by utilizing adaptive websites, as elaborated herein.

For example, share server 30 may adapt at least one presentation property value 330A (e.g., a language) by modifying a URL line of the web page of an adaptive website according to at least one client property (e.g., a language preference), and redirecting the respective client device to a web page corresponding to the modified URL. The at least one presentation property (e.g., the language) may thus be adapted according to the modified URL of the adaptive website.

In another example, share server 30 may adapt at least one presentation property value 330A (e.g., an aspect ratio) by modifying a URL line of a web page of an adaptive website according to at least one client property. For example, embodiments of the invention may join a plurality of client devices in a shared screen session, in which a first client device 20A (e.g., a smartphone) may present a mobile-oriented web page (e.g., accessible via a first URL) and a second client device 20B (e.g., a laptop) may present a PC-oriented web page (e.g., accessible via a second URL). Share server 30 may modify the web page URL according to at least one client property such as a required screen property (e.g., to match a smartphone screen or a PC screen) and redirect the respective client device to a web page corresponding to the modified URL of the adaptive website.

In yet another example, at least one presentation property 330A may include a URL of a web page of an adaptive website. Share server 30 may be configured to adapt the presentation property value 330A (e.g., the URL) to produce an adapted URL 330A', and thus accommodate at least one client property such as a user preference 222A (e.g., a preferred language).

According to some embodiments of the invention, rule-base DB 340 may include one or more rules for translating between respective data objects 110A of different versions (e.g., accessible by different URLs) of webpages of an adaptive website.

For example, a first version of a webpage (e.g., in a first language) of an adaptive website may include an object, such as an action button, having a first identification (ID) number. A second version of the webpage (e.g., in a second language) of the adaptive website may include a respective object, such as the action button, having a second, different ID number. Rule-base DB 340 may include a translation rule that may associate the first ID number with the second ID number. For example, in a shared screen session, a first user may view a first version of a web page of an adaptive website on a first client device (e.g., 20A), and a second user may view a second version of the web page of the adaptive website on a second client device (e.g., 20B). The translation rule of rule-base DB 340 may dictate that, if the first user presses an action button associated with a first ID, then an action corresponding to the respective action button of the second version (having the second ID) will be applied on the second client device.

According to some embodiments of the invention, translation module 330 may cooperate with rule-base DB 340, to translate between actions that may be performed on corresponding web page objects 110A on different versions of web pages of adaptive websites. Pertaining to the same example, a user of client device 20A may press an action button on the first version of the web page, via browser 240A. Share client 220A may monitor this action as an event 223A and may communicate this event in real time or near-real time as message 31A to share server 30. Event synchronization manager 310 may communicate at least one property of the event (e.g., an ID number of the pressed button) as a presentation property 330A to translation module 330. Translation module 330 may cooperate with rule-base DB 340, to translate the at least one property of the event (e.g., the ID number) to produce an adapted presentation property value 330A' (e.g., an adapted ID number). Additionally, or alternatively, translation module 330 may produce adapted presentation property value 330A' according to at least one client property (e.g., 221B, 222B, such as a screen aspect ratio, an appearance preferred by the user, etc.) of client device 20B. Share server 30 may communicate the adapted presentation property value 330A' (e.g., the adapted ID number) to one or more client devices 20B in message 31B. Client devices 20B may apply the button-press action on their respective browsers, in real time or near real time and in accordance with client-specific properties.

As known in the art, one or more portions or objects in a web page may be associated with, or defined by, divisions. Such divisions may be configured, designed and/or referred to either separately or in the context of the entire web page. For example, a user may perform a graphical action in relation to one or more divisions of a web page that may be displayed by a browser on their computing device. Such graphical action may include, for example, marking, highlighting, and/or encircling one or more objects in the web page, corresponding to one or more respective divisions.

According to some embodiments, share server 30 may be configured to manage screen sharing sessions that may include actions or events (e.g., 223A and/or 223B) such as graphical actions, pertaining to one or more divisions of a web page, in a manner that corresponds to at least one client property (e.g., 221A and/or 221B and 222A and/or 222B) as elaborated herein.

For example, in a screen-sharing session, a first version of a webpage of an adaptive website may be presented on client device 20A and may include an object such as a text box, having a first identification (ID) number. A second version of the webpage of the adaptive website may be presented on client device 20B and may include a respective object, such as the text box, having a second, different ID number. Rule-base DB 340 may include a translation rule that may associate the first ID number with the second ID number, as elaborated herein (e.g., in the example of the action-button). A first user of client device 20A may perform a graphical action pertaining to text box object via browser 240A. For example, the first user may encircle or highlight the object so as to draw attention to it. In another example, the first user may draw an object (e.g., using a computer mouse) over the object. Share client 220A may monitor this action as an event 223A and may communicate this event in real time or near-real time as message 31A to share server 30. Message 31A may include properties of the action included in event 223A such as location of a highlighting or encirclement, parameters (e.g., a shape, a color, etc.) of a drawing (e.g., element 225 of FIG. 4), etc. Message 31A may further include an ID number of the respective web page object division. Event synchronization manager 310 may communicate at least one property of the event (e.g., an ID of the division, a shape and/or color of the drawing 225, etc.) as a presentation property 330A to translation module 330. Translation module 330 may cooperate with rule-base DB 340, to translate the at least one property of the event (e.g., the ID number) to produce an adapted presentation property value or content 330A' (e.g., an adapted ID number). Additionally, or alternatively, translation module 330 may translate presentation property 330A (e.g., a shape of the drawing 225) to produce an adapted presentation property 330A' according to at least one client property (e.g., 221B, 222B, such as a screen aspect ratio) of client device 20B. For example, adapted presentation property value or content 330A' may include a representation (e.g., a shape, a color, etc.) of the drawing 225 that may be shrunk or expanded to accommodate an aspect ratio of client device 20B. Share server 30 may communicate the adapted presentation property 330A' value (e.g., the adapted ID number) and properties of the graphical action (e.g., color of the encirclement or highlighting, shape of the drawing 225, etc.) to one or more client devices 20B in message 31B. Client devices 20B may apply the graphical action on their respective browsers, in real time or near real time and in accordance with client-specific properties.

Thus, the first user may apply or perform a graphical action (e.g., encircle, highlight, etc.) in relation to on one or more web page divisions on a first client computing device 20A. Embodiments of the invention may subsequently: (a) adapt, in real time or near real time, a value or content of at least one presentation property (e.g., the encirclement, the shape of the drawing 225, etc.) of the graphical action according to one or more client properties of second client devices 20B; and (b) apply a respective graphical action (e.g., draw a respective shape, encircle a web page object, etc.), relating to respective web page divisions on the one or more second client computing devices 20B.

According to some embodiments, share server 30 may be configured to adapt, in real time or in near-real time, at least one value of a presentation property pertaining to the one or more divisions, based on event indication 223A and/or 223B and on the at least one client property (e.g., 221A and 222A) of one or more client computing devices 20A. Share server 30 may then communicate 31B the adapted presentation property value 330A' to one or more second client computing devices 20B. Share clients 220B of the one or more second client computing devices 20B may receive adapted presentation property value 330A' and may communicate with respective browser modules 240B to presenting the at least one web page portion based on the adapted presentation property value 330A'.

For example, in a screen sharing session, a publisher user (e.g., of client device 20A) may be viewing a web page that may include a web page object that is a text box. The text within the text box may be presented in a first language. A subscriber user (e.g., of client device 20B) may be viewing the same web page that may include the same web page object (e.g., the text box). Share server 30 may receive (e.g., from share client 220A) an ID of the web page object, and may receive (e.g., from share client 220B) a client property such as a user preference 222B of the second user (e.g., a preferred second language). Event synchronization manager 310 may propagate one or more presentation property 330A parameters to translation module 330, including for example: the ID of the web page object (e.g., the text box), the first language, the text in the first language and the second language. Translation module 330 may employ a text translation module or application (e.g., such as "Google translate") to translate the text of the first language to a respective text in the second language and produce an adapted presentation property value or content 330A' that may include the text in the second language. Share server 30 may communicate 31B adapted presentation property value or content 330A' to one or more second client computing devices 20B. Client devices 20B may subsequently present the at least one web page portion or object (e.g., the text box in the web page) based on the adapted presentation property value or content (e.g., with the text translated to the second language).

According to some embodiments of the invention, share server 30 may analyze at least one division of a web page to determine a privacy policy (e.g., element 226 of FIG. 4) associated with the respective division. For example, a web page object such as a payment dialog box, where a user may be prompted to enter a number of their credit card may be associated with a required privacy policy 226. Privacy policy 226 may dictate, for example, that numbers of the credit card may not be seen or may be converted to other characters on browsers of other users participating in a screen sharing session. According to some embodiments, privacy policy 226 may be included in a division associated with the web page object (e.g., as part of web page content 110A). Additionally, or alternatively, the privacy policy 226 may be included as a data element in static site configuration 40A of static web server 40.

Embodiments of the invention may present at least one web page portion or object on a screen of one or more client computing devices (e.g., via a web browser), based on the determined privacy policy 226.

For example, share server 30 may receive (e.g., from share client 220A) at least one presentation property that may be a text (e.g., a credit card number) that may be associated with a privacy policy 226. Privacy policy 226 may dictate, for example, that private text (e.g., the credit card number) may be presented as is on a client device 20A of a publisher user, but may be converted to other characters (e.g., asterisks) on client devices 20B of subscriber users. Event synchronization manager 310 may communicate a presentation property 330A to translation module 330, that may include privacy policy 226 and the private text. Translation module 330 may translate the private text according to privacy policy 226 (e.g., convert the text characters to asterisks) to produce an adapted presentation property value or content 330A'. Share server may communicate adapted presentation property value or content 330A' to the one or more second client devices 20B. Client devices 20B may thus present the at least one data object (e.g., the payment dialog box) via browser 240B on a screen, in real time or near real-time, according to the implemented privacy policy 226 (e.g., with the adapted presentation property value or content 330A' of asterisk characters).

According to some embodiments, share server 30 may be configured to highlight one or more web page portions and/or objects on a first client device 20A of a publisher user according to portions or objects of the shared web page that may be viewed by a subscriber user of a second client device 20B. This configuration may, for example, allow a publisher user to understand what a subscriber user is focused on, during their screen sharing session.

For example, share server 30 may receive 31B, from share client 220B of client device 20B, a viewing indication 224B relating to presentation of the at least one web page portion or object on a screen of client computing device 20B. Share server 30 may further receive (e.g., via share clients 220A, 220B) one or more screen parameters (e.g., aspect ratios) of client devices 20A and 20B (e.g., 31A, 31B respectively). Viewing indication 224B may include, for example an indication of one or more web page objects that may be currently presented on a screen of client device 20B, a location (e.g., coordinates on a screen) whereat the one or more objects are presented, and the like. Event synchronization manager 310 may receive viewing indication 224B and may communicate one or more parameters of viewing indication 224B (e.g., presentation of a web page object, location of the presented web page object, a color of the presented web page object, etc.) as presentation property 330A parameters to translation module 330.

Translation module 330 may adapt, in real time or in near real time at least one presentation property pertaining to the at least one web page division, based on the viewing indication. For example, translation module 330 may translate at least one presentation property value or content 330A to produce one or more adapted presentation property values or contents 330A'. Adapted presentation properties 330A' may include, for example, a bright colorization of at least one presented web page object, to highlight at least one web page object that may be presented on a screen of subscriber user client device 20B (e.g., as indicated by viewing indication 224B).

Share server 30 may communicate 31A the at least one adapted presentation property 330A' to share client 220A of publisher client device 20A, which may in turn communicate the at least one adapted presentation property 330A' to browser 240A. Thus, embodiments of the invention may enable a publisher user of client device 20A to view the focus of one or more subscriber users of client device 20B in a synchronized screen sharing session, regardless of screen properties of the client devices.

As elaborated herein, session manager 320 may maintain a session table 320A that may include, inter alia, a list of events (e.g., 223A, 223B) that may have occurred during a session and/or a list of messages 31 (e.g., 31A, 31B) that may have been transferred among client devices during the session.

Figure 3B:
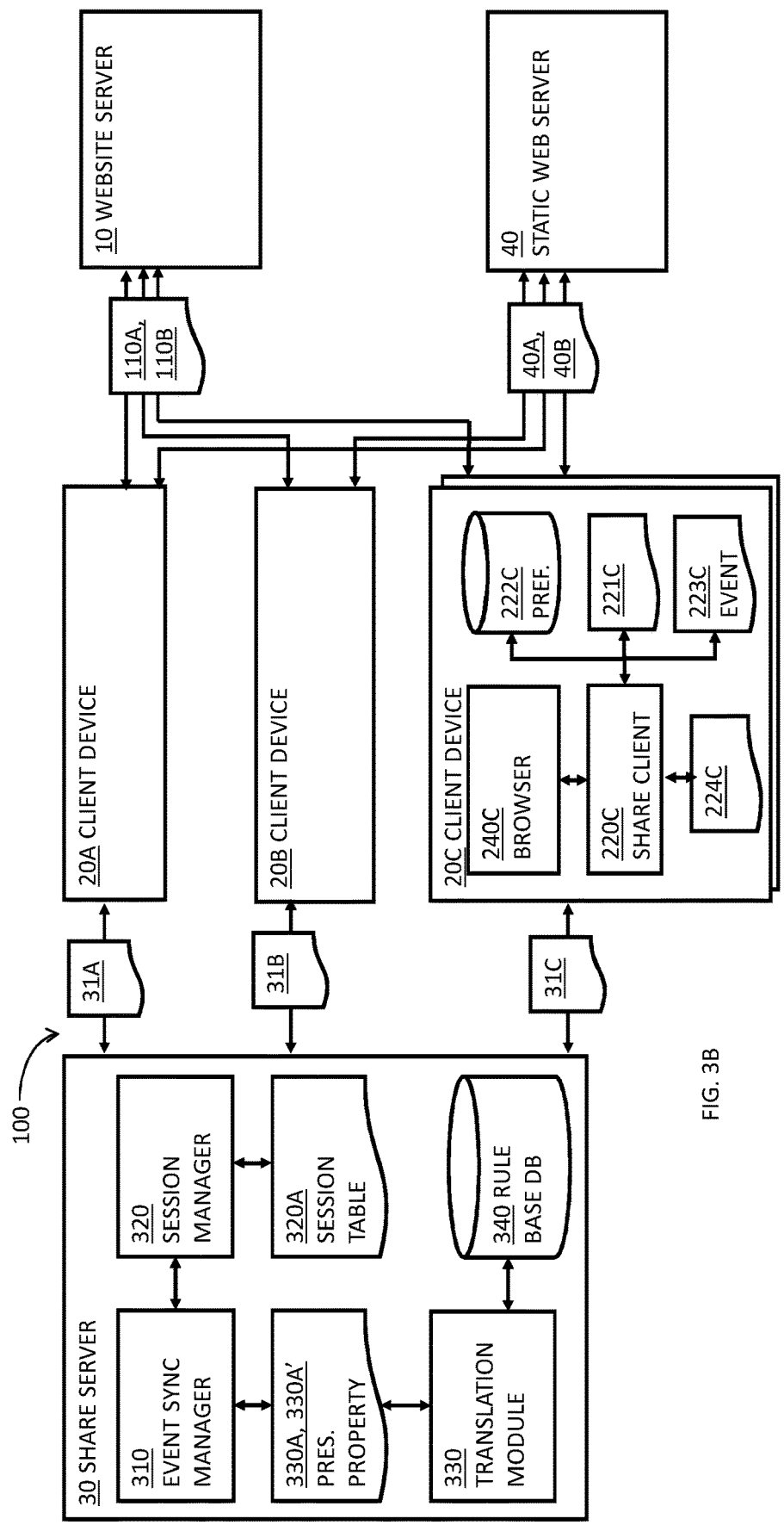

As shown in FIG. 3B, according to some embodiments, session manager 320 may identify a new client device 20C (e.g., a computing device such as computing device 1 of FIG. 1) that may be joining a screen sharing session that may already be in progress (e.g., a screen sharing session between client device 20A and 20B). Session manager 320 may consequently send one or more messages 31C to the newly joined client device 20C, so as to bring it "up to speed" and present the shared web page and/or portions or objects thereof according to actions and events, as elaborated herein, that may have taken place before the new client device joined the session. New client device 20C may have the same capabilities as client devices 20A and 20B, as described above. For example, similar to client devices 20A and 20B, the new client device 20C may include a web browser 240C (e.g., a web browser such as web browsers 240A and 240B) and may include or may implement a share client module 220C (e.g., a share client module such as the share client modules 220A and 220B). In some embodiments of the invention, share client module 220C may communicate (e.g., via the internet) with share server 30 and may provide the at least one client property (e.g., element 221C and 222C) of the new client device 20C as a communication message 31C to share server 30. Share server 30 may receive (e.g., as a communication message 31C) an indication of an event 223C relating to presentation of the at least one web page portion on a screen of a client computing device (e.g., one of 20A, 20B and 20C). In some embodiments of the invention, share server 30 may receive 31C, from share client 220C of new client device 20C, a viewing indication 224C relating to presentation of the at least one web page portion or object on a screen of client computing device 20C.

Figure 4:
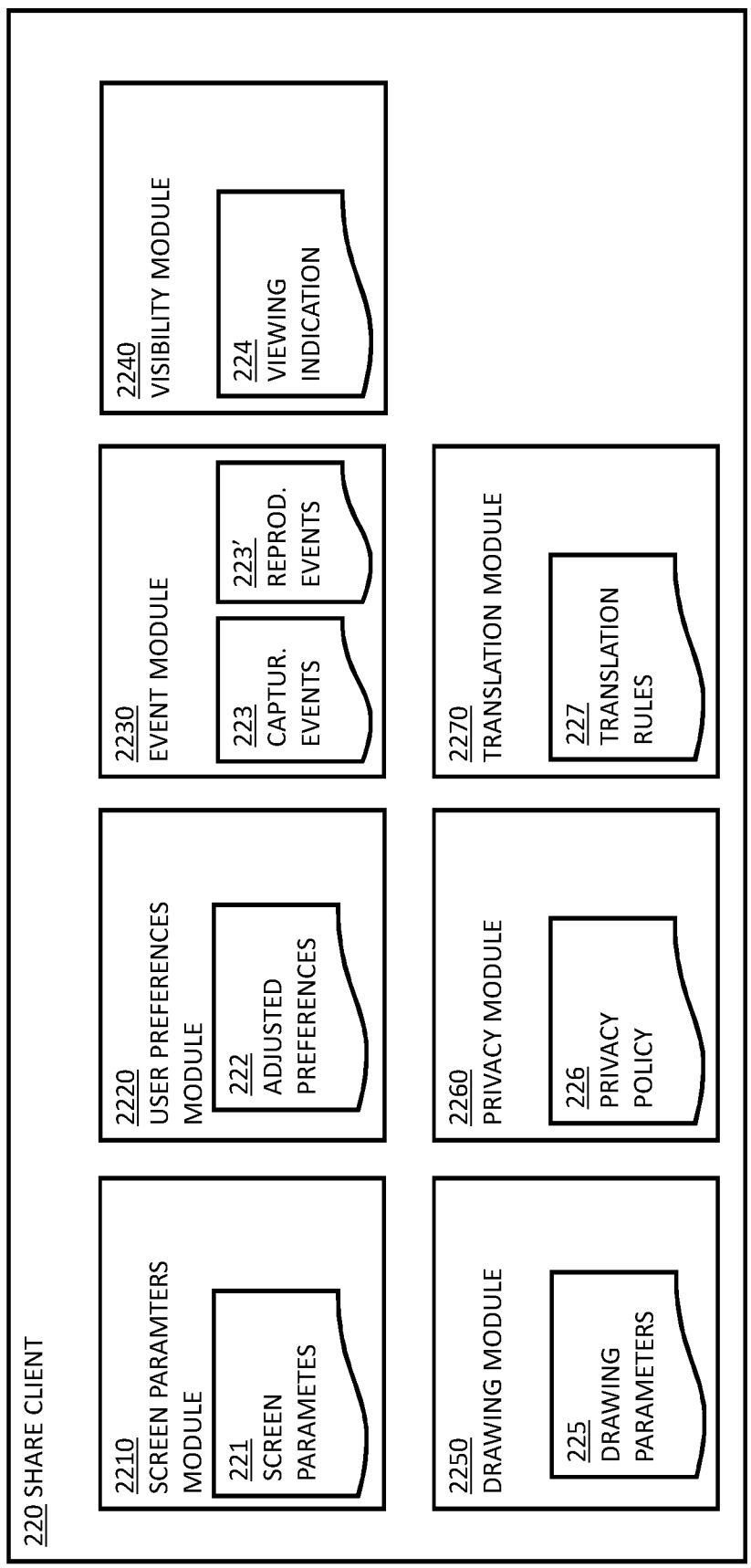
FIG. 4 is a block diagram depicting a share client module that may be included in a system for adaptively sharing at least one portion of a web page between computing devices, according to some embodiments.

FIG. 4 is a block diagram, depicting a share client module 220 that may be included in a system for adaptively sharing at least one portion of a web page between computing devices, according to some embodiments. As shown in FIG. 4, share client module 220 (e.g., at least one of 220A and 220B of FIG. 3A and 220C of FIG. 3B) may include one or more sub-modules, each adapted to handle or maintain one or more proprietary data elements that may be used for adaptively sharing at least one portion of a web page between computing devices as elaborated herein.

For example, share client module 220 may include a screen parameters module 2210, adapted to obtain one or more screen properties or parameters 221 (e.g., 221A, 221B of FIG. 3A, 221C of FIG. 3B) of client computing device (e.g., 20A and 20B of FIG. 3A, and 20C of FIG. 3B, respectively), including for example an aspect ratio, a resolution, a color scheme (e.g., Red Green and Blue (RGB), Black and White (B/W)) a color resolution (e.g., a number of bits per color channel), and the like.

In another example, share client module 220 may include a user preferences module 2220 adapted to obtain one or more user preferences 222 (e.g., element 222A, 222B of FIG. 3A, 222C of FIG. 3B), such as a preferred human language, one or more previous selection that may have been made by the user, and the like, as elaborated herein (e.g., in relation to FIGS. 3A and 3B).

In another example, share client module 220 may include an event module 2230 adapted to obtain or capture at least one event 223 (e.g., 223A, 223B of FIG. 3A, 223C of FIG. 3B) that may occur on a client device (e.g., 20A, 20B or 20C). As elaborated herein (e.g., in relation to FIGS. 3A and 3B), event 223 (e.g., 223A and/or 223B of FIG. 3A and/or 223C of FIG. 3B) may include an action that may have been done by a user or a viewer of client device (e.g., 20A, 20B, or 20C). Additionally, or alternatively, the at least one event 222 may include a change that may be made to the presentation of the web page by a background process such as a change due to an automated refresh of the web page, a change due to time lapse, a change of at least one data content element (e.g., element 110A) of the web page, and the like.

As elaborated herein (e.g., in relation to FIG. 3A), event module 2230 of one client device (e.g., element 20B of FIG. 3A) may obtain (e.g., from share server 30) at least one message (e.g., elements 31A, 31B of FIG. 3A), that may include at least one adapted presentation property value (e.g., element 330A' of FIGS. 3A and 3B) that may correspond to an event or an action that may have been applied on another client device (e.g., element 20A of FIG. 3A or 20C of FIG. 3C). For example, captured event 223 may be an action of pressing a button having a first ID. Event module 2230 of client device 20B may modify event 223, to obtain a reproduced event 223' that may include an adapted presentation property value (e.g., an adapted ID number, as explained herein in relation to FIG. 3A). Share client 220 may then communicate reproduced event 223' to a browser (e.g., element 240B of FIG. 3A), so as to apply the respective action on a screen of client device 20B.

In another example, share client module 220 may include a visibility module 2240 adapted to obtain a viewing indication 224 (e.g., 224A, 224B of FIG. 3A and 224C of FIG. 3B). As elaborated herein (e.g., in relation to FIGS. 3A and 3B), viewing indication 224 may include at least one parameter pertaining to presentation of one or more web page portions or objects on a screen of a client device. For example, viewing indication 224 may include an indication of one or more web page objects that may be currently presented on a screen of a client device, a location (e.g., coordinates on a screen) whereat the one or more objects are presented, and the like.

In another example, share client module 220 may include a drawing module 2250 adapted to obtain one or more parameters of a drawing 225, including for example: an ID of a division that may be associated with the drawing (e.g., where a drawing was made over a specific web page object associated with the division), a shape of the drawing, a color of the drawing, etc. As elaborated herein (e.g., in relation to FIG. 3A), embodiments of the invention may produce an adapted presentation property value 330'A that may include at least one adapted parameter of the drawing 225. For example, the presentation property 330A' may be adapted so as to fit a location (e.g., in relation to a specific web page object) and/or a size of the drawing all screens of client devices participating in the screen sharing session. Share client module 220 may then communicate the at least one adapted parameter of the drawing 225 to browser 240, so as to apply the respective drawing on a screen of client device (e.g., one of 20A, 20B, and 20C).

In another example, share client module 220 may include a privacy module 2260 adapted to obtain one or more parameters of a privacy policy 226. As elaborated herein (e.g., in relation to FIGS. 3A and 3B), privacy policy 226 may dictate at least one rule pertaining to a presentation of one or more web pages or portions or objects thereof. For example, privacy policy 226 may dictate that private text (e.g., the credit card number) may be presented as is on a client device 20A of a publisher user, but may be converted to other characters (e.g., asterisks) on client device 20B of subscriber users or new client device 20C.

Figure 5:
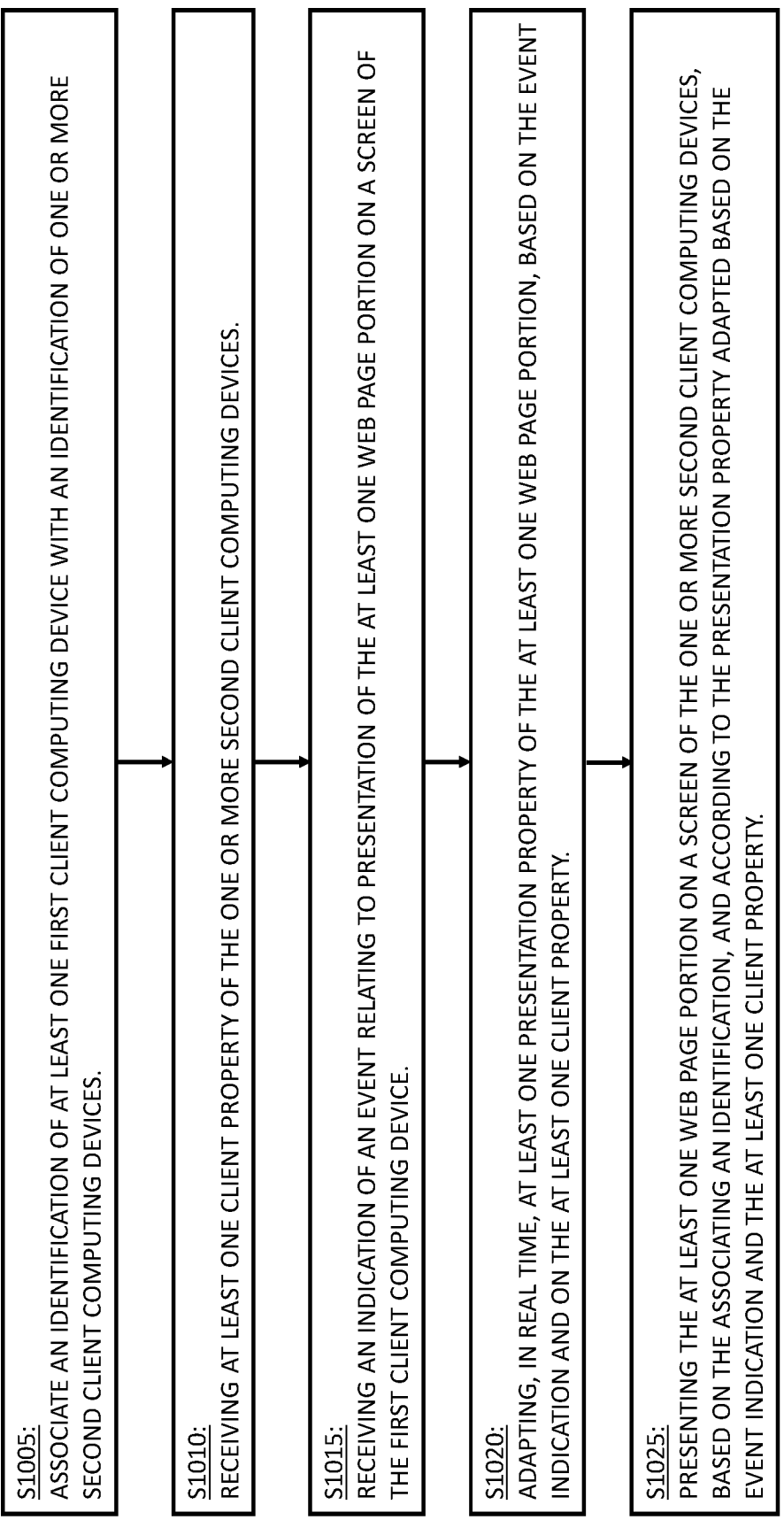
FIG. 5 is a flow diagram depicting a method for adaptively sharing at least one portion of a web page between computing devices, according to some embodiments.

FIG. 5 is a flow diagram, depicting a method for adaptively sharing, by at least one processor or controller (e.g., element 2 of FIG. 1), at least one portion of a web page between computing devices, according to some embodiments. For example, embodiments of the invention may share at least one portion of a web page, such as web page content data (e.g., element 110A of FIG. 3A) and/or web page structural data (e.g., element 110B of FIGS. 3A and 3B) among two or more computing devices (e.g., client computing devices 20A, 20B of FIG. 3A and 20C of FIG. 3B).

As shown in step S1005, at least one processor or controller 2 (e.g., processor 2 of share server element 30 of FIGS. 3A and 3B) may associate (e.g., by session manager element 320 of FIGS. 3A and 3B) an identification of at least one first client computing device (e.g., element 20A of FIG. 3A) with an identification of one or more second client computing devices (e.g., one or more of element 20A of FIG. 3A and 20C of FIG. 3B). For example, session manager element 320 may associate client device 20A with client device 20B as participating in a screen sharing session, as elaborated herein.

As shown in step S1010, the at least one processor or controller 2 (e.g., processor 2 of share server element 30 of FIGS. 3A and 3B) may receive at least one client property (e.g., elements 221A, 221B, 222A, 222B of FIG. 3A and 221C and 222C of FIG. 3B) of the one or more second client computing devices.

As shown in step S1015, the at least one processor or controller 2 (e.g., processor 2 of share server element 30 of FIGS. 3A and 3B) may receive an indication of an event that may relate to presentation of the at least one web page portion on a screen of the first client computing device.

As shown in step S1020, the at least one processor or controller 2 (e.g., processor 2 of share server element 30 of FIGS. 3A and 3B) may adapt, in real time or in near-real time, at least one value of a presentation property of the at least one web page portion, based on the event indication and on the at least one client property. For example, as elaborated herein (e.g., in relation to FIGS. 3A and 3B) event synchronization manager 310 may collaborate with a translation module 330, to adapt, in real time or in near-real time, at least one value of a presentation property 330A of at least one web page portion, based on the event indication and on the at least one client property.

As shown in step S1025, the at least one processor or controller 2 may present the at least one web page portion on a screen of the one or more second client computing devices (e.g., elements 20B of FIG. 3A and 20C of FIG. 3B), based on the associated identification (e.g., the association of device 20A and at least one second device 20B and 20C as participating in a screen sharing session), and according to the presentation property (e.g., the presentation property value adapted based on the event indication and the at least one client property).

Embodiments of the invention may include a practical application for sharing, in real time or near real time altered content of a web page, or a portion thereof, between computing devices in a screen sharing session.

As elaborated herein, embodiments of the invention may include a plurality of improvements over available systems and methods for screen sharing. For example, embodiments of the invention may present shared data content as personalized content according to preference of one or more (e.g., each) user that may participate in the session. Additionally, or alternatively, embodiments of the invention may present shared data content in a manner that may be optimized according to screen properties (e.g., aspect ratio, resolution, etc.) of one or more user's computing device.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention. While some of the disclosure of embodiments of the invention specifically discuss a first user (e.g., a publisher) presenting to a second user (e.g., a subscriber) as an example, it should be understood that embodiments of the invention may include the second user presenting to the first user.

Various embodiments have been presented. Each of these embodiments may of course include features from other embodiments presented, and embodiments not specifically described may include various features described herein.

The invention claimed is:

1. A method of adaptively sharing at least one portion of a web page between computing devices by at least one processor, the method comprising:
  associating an identification of at least one first client computing device with an identification of-a plurality of second client computing devices during a screen sharing session;
  receiving at least one client property and at least one user preference for each of the plurality of second client computing devices;
  receiving an indication of an event relating to presentation of the at least one web page portion on a screen of the first client computing device;
  adapting, during the screen sharing session, for each of the plurality of second client computing devices, at least one presentation property of the at least one web page portion, based on the event indication, on the at least one user preference and on the at least one client property, wherein said at least one presentation property is selected from the group comprising textual content, image content, a drawing, a language, a content of an object of the web page portion, an identification (ID) of an object of the web page portion and combinations thereof, and
  wherein the at least one user preference is preferred language and
  wherein at least one of the second client computing devices has a preferred language that is different from the first client computing device and wherein a different URL is used for the at least one second client computing device than the first client computing device based on the different preferred language;
  presenting the at least one web page portion on a respective screen of each of the plurality of second client computing devices, based on the respective association of identification of each of the plurality of second client devices, and according to the adapted at least one presentation property.

2. The method of claim 1, wherein the client property is selected from a list consisting of: one or more screen properties of the one or more second client computing devices and one or more user preferences associated with the one or more second client computing devices.

3. The method of claim 1, wherein adapting said at least one presentation property comprises adapting a value selected from the group consisting of an aspect ratio, a resolution, a location on the screen of at least one of the first client computing device and the one or more second client computing devices, a color, a page structure, a font, a Uniform Resource Locator (URL) and combinations thereof.

4. The method of claim 3, further comprising:
adapting the value of the presentation property of the at least one web page portion, based on the event indication and on the at least one client property; and
presenting the at least one web page portion on a screen of the one or more second client computing devices, based on the association of identification, and according to the adapted value of the presentation property.

5. The method of claim 1, wherein the at least one web page portion is associated with one or more web page divisions, and wherein the event comprises a graphical action performed in relation to on one or more web page divisions on the first client computing device, and wherein adapting the presentation property comprises applying a respective graphical action relating to respective web page divisions on the one or more second client computing devices.

6. The method of claim 5, wherein the graphical action is selected from marking one or more objects in the web page, highlighting one or more objects in the web page, and encircling one or more objects in the web page.

7. The method of claim 1, wherein the at least one web page portion is associated with one or more divisions of the web page, and wherein the method further comprises:
adapting, in real time, at least one presentation property pertaining to the one or more divisions, based on the event indication and on the at least one client property of the one or more second client computing devices; and
presenting the at least one web page portion on the one or more second client computing devices based on the adapted presentation property.

8. The method of claim 7, further comprising accumulating one or more user preferences associated with the one or more second client computing devices in a database, wherein adapting the at least one presentation property of the one or more divisions comprises personalizing the presentation property according to the accumulated user preferences.

9. The method of claim 7, further comprising analyzing at least one division of the one or more divisions to determine a privacy policy associated with the respective division, and wherein presenting the at least one web page portion on the screen of the one or more second client computing devices is further based on the determined privacy policy.

10. The method of claim 1, wherein the at least one web page portion is associated with one or more divisions of the web page, and wherein the method further comprises:
receiving a viewing indication relating to presentation of the at least one web page portion on the screen of at least one second client computing device;
adapting, in real time, at least one presentation property pertaining to the at least one web page division, based on the viewing indication; and
presenting the at least one web page portion on the screen of the first client computing device, based on the adapted presentation property.

11. A system for adaptively sharing at least one portion of a web page between computing devices, the system comprising: a non-transitory memory device, wherein modules of instruction code are stored, and a processor associated with the memory device, and configured to execute the modules of instruction code, whereupon execution of said modules of instruction code, the processor is further configured to:
associate an identification of at least one first client computing device with an identification of a plurality of second client computing devices;
receive at least one client property of the plurality of second client computing devices;
receive an indication of an event relating to presentation of the at least one web page portion on a screen of the first client computing device;
adapt, during the screen sharing session, for each of the plurality of second client computing devices, at least one presentation property of the at least one web page portion, based on the indication of the event, on the at least one user preference and on the at least one client property, wherein said at least one presentation property is selected from the comprising textual content, image content, a drawing, a language, a content of an object of the web page portion, an identification (ID) of an object of the web page portion and combinations thereof, and
wherein the at least one user preference is preferred language and
wherein at least one of the second client computing devices has a preferred language that is different from the first client computing device and wherein a different URL is used for the at least one second client computing device than the first client computing device based on the different preferred language;
present the at least one web page portion on a respective screen of each of the plurality of second client computing devices, based on the respective association of identification of each of the plurality of second client devices, and according to the adapted presentation property.

12. The system of claim 11, wherein the client property is selected from a list consisting of: one or more screen properties of the one or more second client computing devices and one or more user preferences associated with the one or more second client computing devices.

13. The system of claim 11, wherein adapting said at least one presentation property comprises adapting at least one value selected from an aspect ratio, a resolution, a location on the screen of at least one of first client computing device and the one or more second client computing devices, a color, a page structure, a font, a URL and combinations thereof.

14. The system of claim 13, wherein the processor is further configured to:
adapt, in real time, the value of the presentation property of the at least one web page portion, based on the event indication and on the at least one client property; and
present the at least one web page portion on a screen of the one or more second client computing devices, based on the association of identification, and according to the adapted value of the presentation property.

15. The system of claim 11, wherein the at least one web page portion is associated with one or more web page divisions, and wherein the event comprises a graphical action performed in relation to on one or more web page divisions on the first client computing device, and wherein the processor is configured to adapt the presentation property by applying a respective graphical action relating to respective web page divisions on the one or more second client computing devices.

16. The system of claim 11, wherein the at least one web page portion is associated with one or more divisions of a web page, and wherein the processor is configured to:
adapt, in real time, at least one presentation property pertaining to the one or more divisions, based on the event indication and on the at least one client property of the one or more second client computing devices; and
present the at least one web page portion on the one or more second client computing devices based on the adapted presentation property.

17. The system of claim 16, wherein the processor is configured to:
accumulate one or more user preferences associated with the one or more second client computing devices in a database; and
adapt the at least one presentation property of one or more divisions by personalizing the presentation property according to the accumulated user preferences.

18. The system of claim 16, wherein the processor is configured to:
analyze at least one division of the one or more divisions of the web page to determine a privacy policy associated with the respective division; and
present the at least one web page portion on the screen of the one or more second client computing devices, based on the determined privacy policy.

19. The system of claim 11, wherein the at least one web page portion is associated with one or more divisions of the web page, and wherein processor is configured to:
receive a viewing indication relating to presentation of the at least one web page portion on the screen of at least one second client computing device;
adapt, in real time, at least one presentation property pertaining to the at least one web page division, based on the viewing indication; and
present the at least one web page portion on the screen of the first client computing device, based on the adapted presentation property.

20. A method of adaptively sharing at least one portion of a web page between computing devices by at least one processor, the method comprising:
associating an identification of at least one first client computing device with an identification of a plurality of second client computing devices;
receiving at least one client property and at least one user preference for each of the plurality of second client computing devices;
receiving an indication of an event relating to presentation of the at least one web page portion on a screen of the first client computing device and wherein the first client computing device is a desktop computer;
adapting, during the screen sharing session, for each of the plurality of second client computing devices, at least one presentation property of the at least one web page portion, based on the event indication, on the at least one user preference and on the at least one client property, wherein said at least one presentation property is selected from the group comprising textual content, image content, a drawing, a language, a content of an object of the web page portion, an identification (ID) of an object of the web page portion and combinations thereof, and
wherein at least one of the second client computing devices is a mobile device and the at least one presentation property that is adapted is an aspect ratio that is adapted by modifying a URL link that is used for the mobile device such that an adaptive website is displayed by the mobile device; and
presenting the at least one web page portion on a respective screen of each of the plurality of second client computing devices, based on the respective association of identification of each of the plurality of second client devices, and according to the adapted at least one presentation property.

* * * * *